Figure 1:
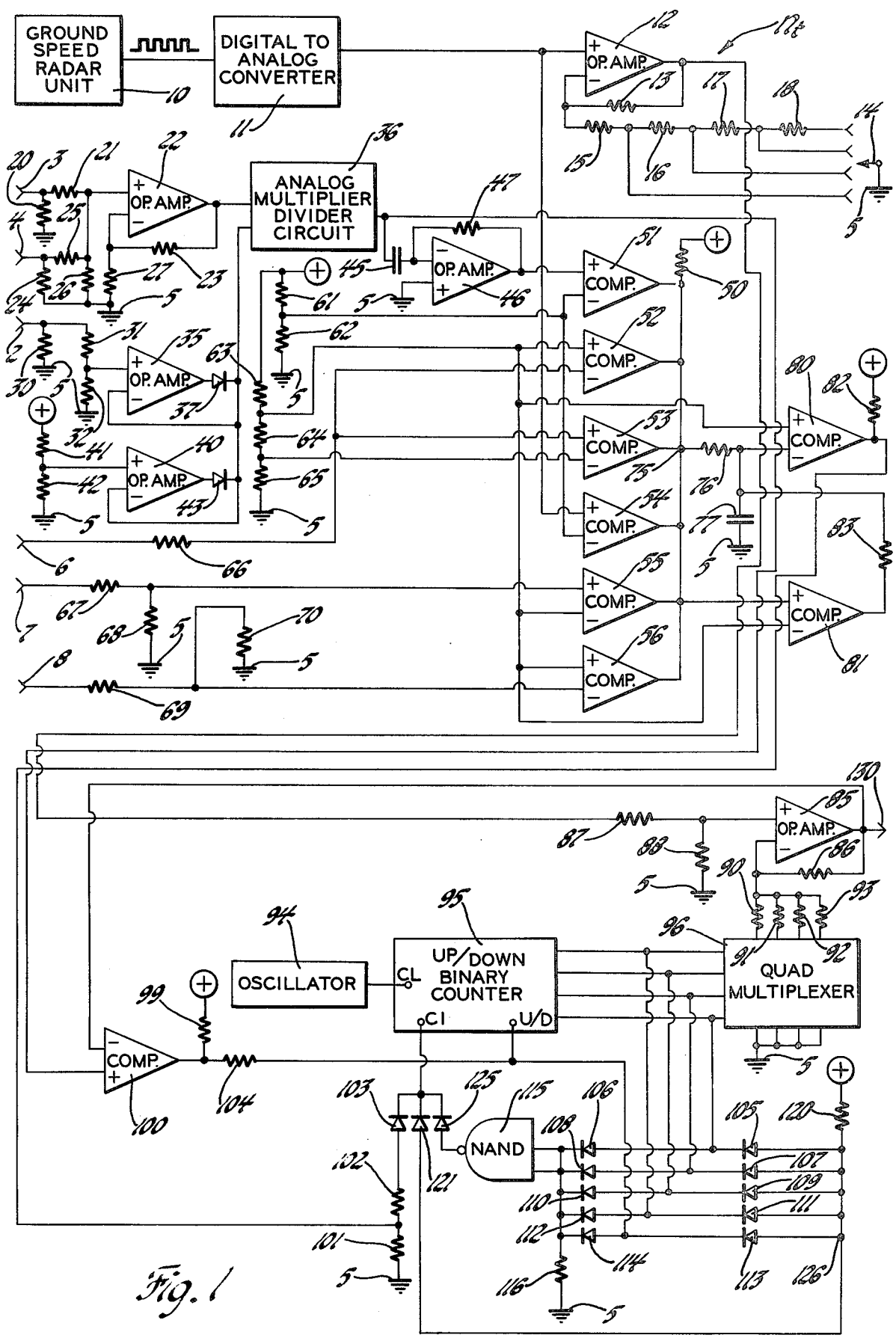

United States Patent [19]

deBuhr et al.

[11] 4,186,331
[45] Jan. 29, 1980

[54] ROTATING ELEMENT ROTATIONAL SPEED SIGNAL CALIBRATING SYSTEM

[75] Inventors: Alfred P. deBuhr, Downers Grove; Bruce R. Meyer, Western Springs; Robert J. Wilson, Bolingbrook, all of Ill.

[73] Assignee: General Motors Corporation, Detroit, Mich.

[21] Appl. No.: 917,073

[22] Filed: Jun. 19, 1978

[51] Int. Cl.² ........................................... B61C 15/08
[52] U.S. Cl. ........................................ 318/52; 290/3; 105/61; 303/109; 361/242
[58] Field of Search ............... 318/52; 290/3; 105/61; 303/109; 246/182 R, 182 C; 361/243, 242

[56] References Cited

U.S. PATENT DOCUMENTS

| | | | |
|---|---|---|---|
| 3,640,586 | 2/1972 | Kohler | 303/91 |
| 3,675,583 | 7/1972 | Sobey et al. | 318/52 |

*Primary Examiner*—Gene Z. Rubinson
*Assistant Examiner*—John W. Redman
*Attorney, Agent, or Firm*—Richard G. Stahr

[57] ABSTRACT

An analog signal representation of the ground speed of a prime mover driven vehicle is modified by the vehicle drive train ratio factor to produce an analog signal representation of the theoretical speed of rotation of the prime mover rotating element based upon vehicle ground speed and another analog signal representation of the actual speed of rotation of the prime mover rotating element based upon selected prime mover operating parameters is produced. A variable gain amplifier circuit converts the theoretical speed of rotation analog signal representation into a system output calibrated analog signal representation of the actual speed of rotation of the prime mover rotating element based upon vehicle ground speed by incrementally adjusting the potential level of the theoretical speed of rotation analog signal representation in a direction toward that of the prime mover operating parameter based actual speed of rotation signal representation.

6 Claims, 2 Drawing Figures

ROTATING ELEMENT ROTATIONAL SPEED SIGNAL CALIBRATING SYSTEM

This invention is directed to a system for calibrating an electrical signal representation of the theoretical speed of rotation of the rotating element of a prime mover adapted to drive a vehicle in a manner to produce an output electrical signal representation of the actual speed of rotation of the prime mover rotating element based upon vehicle ground speed.

One example of an application for the rotating element rotational speed signal calibrating system of this invention is with a Diesel-electric locomotive wherein at least one electrically energized traction motor is employed as the prime mover to drive the locomotive. It is conventional practice to limit the maximum wheel slip of Diesel-electric locomotives to a very low value. Any wheel slip beyond the limit value is considered to be excessive and undesirable. Generally, wheel slip control is carried out by detecting excessive wheel slip whenever it occurs and taking corrective action by reducing the power supplied to the traction motors until wheel slip returns to a value below the established limit. It has been found that, as wheel slip increases, the rail adhesion or friction between the wheel and rail also increases up to some peak value and then decreases with a further increase of wheel slip. Thus, to obtain optimum tractive effort by the locomotive, particularly during drag service, it is desirable to allow the wheels to slip sufficiently to attain the maximum adhesion value. Consequently, wheel slip control arrangements have been developed to provide for the control of wheel slip in a manner to permit the maximum adhesion between the wheel and rail to be attained.

For proper operation of these wheel slip control arrangements, it is necessary that the speed of rotation of the wheels be referenced to actual locomotive ground speed for the reason that at any speed of rotation of the wheels while the locomotive is moving at a corresponding ground speed, the wheels may not be slipping at a value above the established limit, however, at this same speed of rotation of the wheels while the locomotive is moving at a slower ground speed, the wheels are slipping at a value above the established limit. It is necessary, therefore, that a signal indicative of locomotive ground speed be provided.

To produce the necessary electrical signal representation of the ground speed of a Diesel-electric locomotive, a ground speed radar unit may be employed. The ground speed radar unit may be rigidly secured to the locomotive frame and oriented in such a manner that it scans the surface over which the locomotive is passing. When mounted in this manner, the ground speed radar unit produces an output digital signal representation of locomotive ground speed.

To realize maximum wheel slip control accuracy, the electrical signal indicative of locomotive ground speed is accurately calibrated relative to the actual speed of rotation of the prime mover rotating element during periods of no wheel slip conditions. A continuous updating of this calibration may be necessary for the reason that certain errors may be introduced during locomotive operation. Two examples of sources of errors are a mechanical change of the mounting angle of the ground speed radar unit as a result of vibration or a mechanical blow and the wear of the locomotive wheels which may be of the order of four inches in diameter over the life of the wheel. It is to be specifically understood that these two examples of sources of errors are representative but are not exhaustive.

Because errors are certain to be introduced during locomotive operating conditions, a system which provides for the calibration of the ground speed signal relative to the actual speed of rotation of the prime mover rotating element during the operational life of the locomotive is desirable.

It is, therefore, an object of this invention to provide a system for periodically calibrating an electrical signal representation of the speed of rotation of a prime mover rotating element based upon the ground speed of a prime mover driven vehicle relative to the actual speed of rotation of the prime mover rotating element.

It is another object of this invention to provide a system for periodically calibrating an electrical signal representation of the speed of rotation of a prime mover rotating element based upon the ground speed of a prime mover driven vehicle by comparing it with another signal indicative of the actual speed of rotation of the prime mover rotating element.

It is another object of this invention to provide a system for periodically calibrating an electrical signal representation of the speed of rotation of a prime mover rotating element based upon the ground speed of a prime mover driven vehicle wherein this first signal is compared with a calculated speed of rotation of a prime mover rotating element signal and the value of the first signal is varied in value in a direction toward that of the calculated signal.

In accordance with this invention, a system for calibrating an electrical signal representation of the rotational speed of a prime mover rotating element is provided wherein an electrical signal representation of the ground speed of a prime mover driven vehicle is modified into another electrical signal representation of the theoretical speed of rotation of the prime mover rotating element based upon vehicle ground speed that is further modified into a system output electrical signal representation of the actual speed of rotation of the prime mover rotating element based upon vehicle ground speed.

Figure 2:
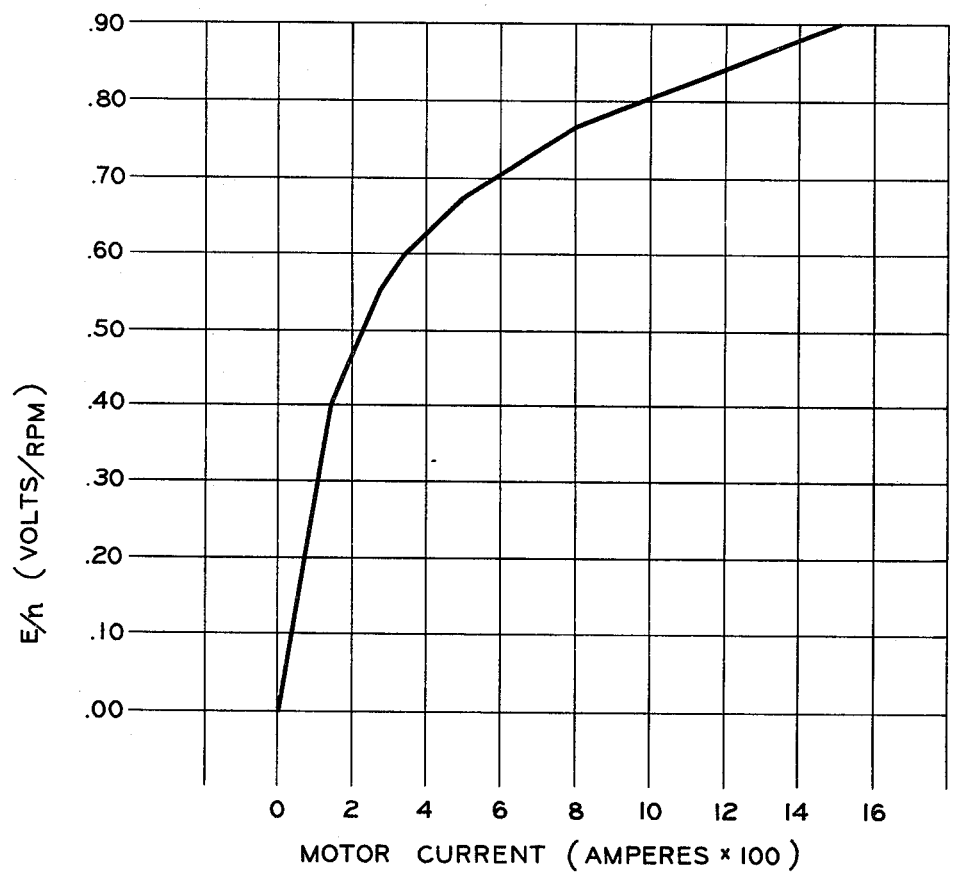

For a better understanding of the present invention, together with additional objects, advantages and features thereof, reference is made to the following description and accompanying drawing in which:

FIG. 1 sets forth in schematic form the rotating element rotational speed signal calibrating system of this invention; and FIG. 2 is a curve useful in understanding the circuit of FIG. 1.

BRIEF SUMMARY OF THE INVENTION

The system of this invention converts an electrical signal representation of the ground speed of a prime mover drive vehicle into a calibrated system output electrical signal representation of the speed of rotation of the vehicle prime mover rotating element based upon vehicle ground speed. The electrical signal representation of vehicle ground speed is modified by the vehicle driven train ratio factor in such a manner that this electrical signal representation is converted into an electrical signal representation of the theoretical speed of rotation of the prime mover rotating element based upon vehicle ground speed. That is, this second electrical signal is a representation of the speed at which the prime mover rotating element should be rotating to drive the vehicle at the ground speed indicated by the electrical signal representation of vehicle ground speed and is a representation of the theoretical speed of rotation of the prime mover rotating element for the reason that it may represent a value different than the actual speed of rotation of the prime mover rotating element because of errors that may have been introduced. While the vehicle is being operated under conditions during which vehicle wheel slip is in all probability not occurring, the electrical signal representation of the theoretical speed of rotation of the prime mover rotating element is calibrated into a system output electrical signal representation of the speed of rotation of the prime mover rotating element based upon vehicle ground speed. To effect the calibration, the system output electrical signal representation is compared with another electrical signal representation of the speed of rotation of the prime mover rotating element that is based upon selected prime mover operating parameters and the value of the system output electrical signal representation is incrementally adjusted in a direction toward that of the electrical signal representation of the speed of rotation of the prime mover rotating element based upon the selected prime mover operating parameters whereby, as a result of this calibration procedure, both of these electrical signals are representative of the same quantity. Consequently, any difference in the value of these two compared electrical signal representations that may have been introduced by errors is substantially eliminated. The system output signal, therefore, is a calibrated system output electrical signal representation of the speed of rotation of the prime mover rotating element based upon vehicle ground speed.

The rotating element rotational speed signal calibrating system of this invention will be described in this specification with reference to Diesel-electric locomotive application. The output signal produced by this system may be used with the locomotive wheel slip control system disclosed and described in U.S. Pat. No. 3,982,164, de Buhr et al, that issued Sept. 21, 1976 and is assigned to the same assignee as is this invention. As is well known in the Diesel-electric locomotive art, an on-board Diesel engine driven electrical generating system supplies the electrical power and a direct current traction motor is operationally coupled to each driven locomotive axle through a drive train having a predetermined input to output drive train ratio. The traction motors, of course, are the vehicle or locomotive prime mover or movers. In the following description, the "vehicle" will be referred to as a locomotive, the "prime mover" will be referred to as the traction motor having the fastest rotating armature that is selected in a manner to be later explained, the "prime mover rotating element" will be referred to as the armature of this motor and the voltage generated by the on-board Diesel engine driven electrical generating system will be referred to as the "generator voltage".

As point of reference or ground potential is the same point electrically throughout the system, it is illustrated in FIG. 1 by the accepted schematic symbol and referenced by the numeral 5.

The system of this invention employs six conventional operational amplifier circuits, nine conventional voltage comparator circuits, a NAND gate, and up/down binary counter circuit, a quad multiplexer circuit and an analog multiplier/divider arithmetic unit. As these circuit elements may be commercially available items well-known in the art and, per se, form no part of this invention, each has been illustrated in block form in FIG. 1 of the drawing. Furthermore, these devices are only examples of circuit elements suitable for use with the system of this invention, consequently, there is no intention or inference of a limitation thereto as other circuit elements having similar electrical characteristics may be substituted therefore without departing from the spirit of the invention. In an actual embodiment, the conventional voltage comparator circuits are of the type marketed by RCA Corporation under the designation CA339G, the conventional operational amplifier circuits, the NAND gate, the up/down binary counter ciruit and the quad multiplexer circuit are of the type marketed by Motorola Semiconductor Products Incorporated under the respective designations MC1558, MC14011, MC14516 and MC14066 and the analog multiplier/divider arithmetic unit is of the type marketed by the Burr-Brown Research Corporation under the designation Model No. 4302.

In accordance with logic terminology well-known in the art, throughout this specification logic signals will be referred to as "High" or logic 1 and "Low" or logic 0 signals. For purposes of this specification and without intention or inference of a limitation thereto, the "High" or logic 1 signals will be considered to be of a positive polarity potential and the "Low" or logic 0 signals will be considered to be of zero or ground potential.

In the interest of reducing drawing complexity, specific operating potential connections to the circuit elements of FIG. 1 have not been shown. It is to be specifically understood, however, that rated operating potential is supplied to these circuit elements. At certain points in the Figure where it is desirable to indicate a direct current potential source, the positive polarity output terminal of a suitable regulated voltage source with respect to point of reference or ground potential 5 is illustrated as a plus sign within a circle.

In FIG. 1 of the drawing, which sets forth the system of this invention in schematic form, six input circuit points through which externally generated electrical signals are applied to the system are referenced by the numerals 2, 3, 4, 6, 7 and 8. The specific signals applied to these input circuit points will be described in detail later in this specification.

To produce an electrical signal representation of locomotive ground speed, a commercially available ground speed radar unit 10 may be employed. The ground speed radar unit 10 may be mounted upon the locomotive frame and oriented in a manner to scan the surface over which the locomotive is passing. In the actual embodiment, the ground speed radar unit is a commercially available item marketed by RCA Corporation under the designation Type S571. The digital output signals of ground speed radar unit 10, which may be of the order of 21 hertz per mile per hour ground speed, are applied as input signals to a conventional digital to analog converter circuit 11. As digital to analog converter circuit 11 may be any of the many digital to analog converter circuits well-known in the art and, per se, forms no part of this invention, it is illustrated in FIG. 1 in block form. Digital to analog converter circuit 11 converts the digital input signals produced by ground speed radar unit 10 into an analog output electrical signal representation of locomotive ground speed. In the actual embodiment, this signal is so scaled that 10 volts equals 100 miles per hour.

As has been previously brought out, a direct current traction motor is operationally coupled to each driven locomotive axle through a drive train having a predetermined input to output drive train ratio. The analog output electrical signal representation of locomotive ground speed produced by digital to analog converter circuit 11 is modified by the drive train ratio factor in such a manner that this signal representation is converted into a second electrical signal representation of the theoretical speed of rotation of a traction motor armature based upon locomotive ground speed. Therefore, the output first electrical signal representation of digital to analog converter circuit 11 is applied to the noninverting input terminal of operational amplifier circuit 12 having a feedback resistor 13 connected between the output terminal and the inverting input terminal thereof. If desirable, a selector switch 14 and a series of input resistors 15, 16, 17 and 18 may be employed to adapt the system of this invention to different input to output drive train ratios. By connecting various combinations of these input resistors between the inverting input terminal of operational amplifier circuit 12 and point of reference or ground potential 5 through selector switch 14, the gain of operational amplifier circuit 12 may be adjusted to a value at which this device modifies the first electrical signal representation of locomotive ground speed into an output analog signal representation of the theoretical speed of rotation of a traction motor armature based upon locomotive ground speed, hereinafter referred as the $N_t$ signal. For example, should the input to output drive train ratio be 66:20, the gain of operational amplifier circuit 12 would be adjusted accordingly.

Based upon selected known and measurable traction motor operating parameters, an analog signal representation of the actual speed of rotation of a traction motor armature is calculated in a manner now to be explained.

Set forth in FIG. 2 of the drawing is a typical series direct current traction motor (E/n/Im) curve wherein Im is the motor current in amperes, E is the motor back EMF in volts per motor RPM and n is the motor speed in RPM. This E/n versus Im characteristic curve is empirically determined for the traction motor or motors employed. Function generating circuitry well-known in the art generates this curve externally of the system of this invention by the piece-wise approximation method and is applied as an analog signal representation of E/n to the system of this invention through input circuit point 2. One example of a function generating circuit suitable for this application is set forth in FIG. 7.20 on Page 252 of the McGraw-Hill Book Company Publication, "Operational Amplifiers Design And Application". In the actual embodiment, this signal is so scaled that E/n equals 1 equals 10 volts.

An analog signal representation of the generator voltage V applied across the direct current traction motors is applied through input circuit point 3. This analog signal representation may be produced in a manner well-known in the art. For example, the voltage drop across a precision resistor of a known ohmic value while conducting motor current or a known proportion of motor current may be employed. In the actual embodiment, this signal is so scaled that 10 volts equals 1,250 generator volts.

When the system of this invention is employed with Diesel-electric locomotives having more than one traction motor, the one having the fastest rotating armature is selected as the prime mover rotating element reference. As the traction motor having the fastest rotating armature has the lowest motor current value, circuitry external of the system of this invention and well-known in the art senses the motor current of all of the traction motors, detects the lowest motor current value and reproduces this current value as an output analog signal representation of lowest motor current.

An analog signal representation of the fastest rotating motor armature IR drop is applied in a negative sense to input circuit point 4. This analog signal representation is the product of the value of the lowest motor current multiplied by the known direct current ohmic resistance value of the fastest rotating motor armature. This analog signal representation may be produced in a manner well-known in the art. For example, the voltage drop across a precision resistor having a resistance value equal to the known direct current resistance value of the armature while the resistor is conducting motor current or a known proportion of motor current may be employed. In the actual embodiment, this signal is so scaled that 10 volts equals 1,250 volts.

An analog signal representation of the value of motor current for the traction motor having the fastest rotating armature is applied to input circuit point 6. This analog signal representation may be produced in a manner well-known in the art. For example, the voltage drop across a precision resistor having a known resistance value while the resistor is carrying motor current or a known proportion of motor current may be employed. In the actual embodiment, this signal is so scaled that 10 volts equals 1,500 amperes.

While the locomotive is in the motoring mode, that is, being driven by the traction motor or motors as opposed to coasting or being braked, a logic 1 signal is applied to input circuit point 7. At all other times, a logic 0 signal is applied to this input circuit point.

While the Diesel engine throttle valve is at a low throttle position, that is, at a setting at which the locomotive is driven at a speed of the order of 5 MPH on the level, a logic 1 signal is applied to input circuit point 8. At all other times, a logic 0 signal is applied to this input circuit point.

The generator voltage analog signal representation is applied through input circuit point 3 and appears across resistor 20. This signal is applied through resistor 21 to the noninverting input terminal of operational amplifier circuit 22 having a feedback resistor 23 connected between the output terminal and the inverting input terminal thereof. The analog signal representation of the armature IR drop is applied through input circuit point 4 and appears across resistor 24. This signal is applied through resistor 25 to the noninverting input terminal of operational amplifier circuit 22. The circuitry including operational amplifier circuit 22 and resistors 20, 21, 23, 24, 25, 26 and 27 comprises a conventional summing circuit arrangement that functions to produce an output signal representation of the difference between the armature IR drop subtracted from the generator voltage. This output signal is the analog signal representation of the value of the motor back EMF and will be referred to as the motor back EMF signal E. The analog signal representation of the value E/n that is applied through input circuit point 2 appears across resistor 30. This signal is applied across a voltage divider network consisting of series resistors 31 and 32. The junction between series resistors 31 and 32 is connected to the noninverting input terminal of operational amplifier circuit 35 which functions as a buffer amplifier circuit of unity gain.

The output signal of operational amplifier circuit 22, the motor back EMF signal E, is applied to one of the input terminals of analog multiplier/divider arithmetic unit 36 and the output signal of operational amplifier circuit 35, the E/n signal, is applied through isolating diode 37 to the other input terminal of the analog multiplier/divider arithmetic unit 36. Conventional operational amplifier circuit 40 having the noninverting input terminal thereof connected to the junction between series resistors 41 and 42 connected across the positive polarity output terminal of a regulated voltage source and point of reference or ground potential 5 is provided to prevent the analog signal representation of E/n from going to zero. Operational amplifier circuit 40 functions as a buffer amplifier circuit having unity gain which produces a substantially constant output signal that is applied through isolating diode 43 to the same input terminal of analog multiplier/divider arithmetic unit 36 as is the E/n signal.

In response to the input signals applied to the input terminals thereof, analog multiplier/divider arithmetic unit 36 performs the arithmetic function of dividing the motor back EMF signal E applied to one input terminal thereof by the E/n signal applied to the other input terminal thereof and produces an output analog signal representation of the quotient of this division function. This output signal is the analog signal representation of the calculated speed of rotation of a motor armature n, hereinafter referred to as the Nc signal.

In the interest of accuracy, the system of this invention is enabled to perform the calibration function only while the locomotive is being operated under conditions during which wheel slip is in all probability not occurring. Consequently, circuitry response to selected locomotive and traction motor operating parameters for producing a calibrate signal only while all of these selected parameters are satisfied is provided. These selected parameters are as follows:

1. The locomotive must not be slowing down or decelerating at a rate more rapidly than 0.2 miles per hour per second;
2. The motor current of the traction motor having the fastest rotating armature must be more than 200 amperes;
3. The motor current of the traction motor having the fastest rotating armature must be less than 600 amperes;
4. The ground speed of the locomotive must be more than 5 MPH;
5. The locomotive must be in the motoring mode as hereinabove set forth; and
6. The Diesel engine throttle must be in a low throttle position as hereinabove set forth.

The Nc output signal of analog multiplier/divider arithmetic unit 36 is applied through a coupling capacitor 45 to the inverting input terminal of operational amplifier circuit 46 having a feedback resistor 47 connected between the output terminal and the inverting input terminal thereof and the noninverting input terminal connected to point of reference or ground potential 5. This circuitry comprises a well-known differentiator circuit that produces an output analog signal representation of the first derivative of the Nc analog signal. Consequently, the output signal of operational amplifier circuit 46 is the analog signal representation of the acceleration or deceleration of the traction motor armature. This signal is applied to the noninverting input terminal of voltage comparator circuit 51. To provide a reference signal for comparator circuit 51 the inverting input terminal thereof is connected to the junction between series resistors 61 and 62 connected across the positive polarity output terminal of a regulated voltage source and point of reference or ground potential 5. In the actual embodiment, the ohmic values of resistors 61 and 62 are proportioned relative to each other in such a manner that the potential upon the junction therebetween is of a positive polarity with respect to point of reference or ground potential 5 and is of a predetermined magnitude. Consequently, when the locomotive is decelerating at a rate more than 0.2 miles per hour per second, voltage comparator circuit 51 produces a logic zero output signal and while the locomotive is not decelerating at a rate more than 0.2 miles per hour per second, comparator circuit 51 produces a logic 1 output signal.

The motor current signal present upon input circuit point 6 is applied through resistor 66 to the inverting input terminal of voltage comparator circuit 52 and to the noninverting input terminal of voltage comparator circuit 53. To provide reference signals for comparator circuits 52 and 53, resistors 63, 64 and 65 are connected in series across the positive polarity output terminal of a regulated voltage source and point of reference or ground potential 5. The noninverting input terminal of comparator circuit 52 is connected to the junction between series resistors 63 and 64 and the inverting input terminal of comparator circuit 53 is connected to the junction between series resistors 64 and 65. In the actual embodiment, the scaling factor selected for these reference signals is 4 volts equals 600 amperes. Consequently, the ohmic values of resistors 63, 64 and 65 are proportioned relative to each other in such a manner that the potential upon the junction between resistors 63 and 64 is of a magnitude of 4.07 volts DC and the potential upon the junction between resistors 64 and 65 is of a magnitude of 1.33 volts DC and both are of a positive polarity with respect to point of reference or ground potential 5. Consequently, when the motor current is more than 600 amperes, comparator circuit 52 produces a logic 0 output signal, when the motor current is less than 200 amperes, comparator circuit 53 produces a logic 0 output signal and when the motor current is between 200 and 600 amperes each of comparator circuits 52 and 53 produces a logic 1 output signal.

The output analog electrical signal representation of vehicle ground speed produced by digital to analog converter circuit 11 is applied to the noninverting input terminal of voltage comparator circuit 54, the noninverting input terminal of which is connected to the junction between series resistors 61 and 62. The ohmic value of resistors 61 and 62 are proportioned relative to each other in such a manner that the potential upon the junction therebetween is of a positive polarity with respect to point of reference or ground potential 5 and is of a magnitude of 0.498 volts DC. As has been previously brought out, the output signal of digital to analog converter circuit 11 is so scaled that 10 volts equals 100 miles per hour. Therefore, 0.5 volts equals 5 miles per hour. Consequently, with locomotive speed less than 5 miles per hour, comparator circuit 54 produces a logic 0 output signal and with locomotive speeds greater than 5 miles per hour, comparator circuit 54 produces a logic 1 output signal.

As has been previously brought out, while the locomotive is in the motoring mode, a logic 1 signal is applied to input circuit point 7 and a logic 0 signal is applied to this input circuit point at all other times. While the locomotive is in the motoring mode, the logic 1 signal applied to input circuit point 7 is divided by resistors 67 and 68 and applied to a noninverting input terminal of voltage comparator circuit 55, the noninverting input terminal of which is connected to the junction between series resistors 63 and 64. The ohmic value of resistors 67 and 68 are so proportioned relative to each other that the signal present upon the junction therebetween is of a positive polarity potential greater than that upon the junction between series resistors 63 and 64. Consequently, while the locomotive is in the motoring mode comparator circuit 55 produces a logic 1 output signal and at all other times produces a logic 0 output signal.

As has been previously brought out, while the Diesel engine throttle is at a low throttle position, a logic 1 signal is applied to input circuit point 8 and a logic 0 signal is applied to this circuit point at all other times. While the Diesel engine throttle is at one of the selected low throttle positions, the logic 1 signal applied to input circuit point 8 is divided across resistors 69 and 70 and applied to the inverting input terminal of comparator circuit 56, the noninverting input terminal of which is connected to the junction between series resistors 63 and 64. The ohmic values of resistors 69 and 70 are so proportioned relative to each other that the signal present upon the junction therebetween is of a potential level higher than that upon the junction between series resistors 63 and 64 while the Diesel engine throttle is at a low throttle position. Consequently, comparator circuit 56 produces a logic 1 output signal while the Diesel engine throttle valve is at a low throttle position and a logic 0 output signal at all other times.

As the output terminal of each of comparator circuits 51 through 56, inclusive, is the uncommitted collector electrode of an NPN transistor, resistor 50 is a pull-up resistor for these devices that is connected between the output terminal of all of these devices and the positive polarity output terminal of a regulated voltage source. During those periods of locomotive operation while all of the six previously set forth selected locomotive and traction motor operating parameters are satisfied, each of comparator circuits 51 through 56, inclusive, produces a logic 1 output signal. Consequently, a logic 1 output signal is present upon junction 75. Should any one or more of these selected parameters be not satisfied, the corresponding comparator or comparator circuits produces a logic 0 output signal which appears upon junction 75. For example, should the locomotive speed be less than 5 miles per hour, comparator circuit 54 would produce a logic 0 output signal that would appear upon junction 75. While all of these selected parameters are satisfied, the logic 1 signal upon junction 75 is applied through a delay network comprising resistor 76 and capacitor 77 to the inverting input terminal of comparator circuit 80, the noninverting input terminal of which is connected to the junction between series resistors 63 and 64. The reference signal of 4.07 volts present upon the junction between series resistors 63 and 64 is less than the level of the logic 1 signal present upon junction 75. Consequently, with the presence of a logic 1 signal upon junction 75, comparator circuit 80 produces an output logic 0 calibrate signal and with the presence of a logic 0 signal upon junction 75, comparator circuit 80 produces a logic 1 output signal. Comparator circuit 81 is employed to provide a discharge path for capacitor 77 during those times that all of the previously described selected locomotive and motor operating parameters are not satisfied. The signal present upon junction 75 is applied to the noninverting input terminal of comparator circuit 81 and the noninverting input terminal is connected to the junction between series resistors 63 and 64. Consequently, both comparator circuits 80 and 81 are referenced to the same reference signal. While all of the selected locomotive and traction motor operating parameters are satisfied, comparator circuit 81 produces a logic 1 output signal as the level of the logic 1 signal present upon 75 is greater than that of the signal present upon the junction between series resistors 63 and 64. When any one or more of the selected locomotive and traction motor operating parameters are not present, a logic 0 signal is present upon junction 75, consequently, the output NPN transistor of comparator circuit 81 is rendered conductive to provide a discharge path for capacitor 77 to point of reference or ground potential. Resistors 82 and 83 are the conventional pull-up resistors employed with voltage comparator circuits of this type.

Circuitry is provided for establishing, during the presence of each calibrate signal, a calibration factor for the electrical signal representation of the theoretical speed or rotation of the fastest rotating traction motor armature, the output signal $N_t$ of operational amplifier circuit 12, and for modifying this signal representation by the calibration factor in such a manner that this signal representation is converted into a system output calibrated analog signal representation of the actual speed of rotation of the fastest rotating traction motor armature based upon locomotive ground speed. This circuitry is responsive to the calibrate signal, the system output calibrated analog signal representation and the analog multiplier/divider arithmetic unit 36 output analog signal representation Nc of the calculated speed of rotation of the fastest rotating traction motor armature and is effective to establish the calibration factor required to modify the operational amplifier circuit 12 output signal representation $N_t$ in such a manner that the system output calibrated analog signal representation and the analog multiplier/divider arithmetic unit 36 output analog signal representation Nc are representative of substantially the same quantity.

To convert the operational amplifier circuit 12 output analog signal representation of the theoretical speed of rotation of the fastest rotating traction motor armature into a system output calibrated analog signal representation, a conventional operational amplifier circuit 85 having a feedback resistor 86 connected between the output terminal and the noninverting input terminal thereof is employed. The $N_t$ output signal of operational amplifier circuit 12 is divided by resistors 87 and 88, the junction therebetween being connected to the noninverting input terminal of operational amplifier circuit 85. In a manner to be explained later in this specification, the gain of operational amplifier circuit 85 may be varied by connecting combinations of input resistors 90, 91, 92 and 93 to point of reference or ground potential 5.

An oscillator circuit 94 supplies clock pulses to an up/down binary counter circuit 95. As oscillator circuit 94 may be any of the many oscillator circuits well known in the art and, per se, forms no part of this invention, it is illustrated in block form in FIG. 1. In the actual embodiment, oscillator circuit 94 had an output clock frequency of 5 hertz. Up/down binary counter circuit 95 is of the type that increments the input clock pulses by successive counts of one in response to a logic 1 signal applied to the U/D input terminal, decrements the input clock pulses by successive counts of one in response to a logic 0 applied to the U/D input terminal thereof, is enabled to count clock pulses with the presence of a logic 0 signal upon the CI input terminal thereof and is disenabled by the presence of a logic 1 signal to this input terminal.

Binary counter circuit 95 produces an output four bit binary code group that is applied to respective input terminals of a quad multiplexer circuit 96. In response to this input binary code group, quad multiplexer circuit 96 connects various combinations of resistors 90, 91, 92 and 93 to point of reference or ground potential 5 to vary the gain of operational amplifier circuit 85. With an input four bit binary code group to quad multiplexer circuit 96 in the actual embodiment, the range of gain of operational amplifier circuit 85 is varied from unity to 1.24 in 16 steps.

The system output calibrated analog signal representation of operational amplifier circuit 85 is applied to the inverting input terminal of voltage comparator circuit 100 and the analog multiplier/divider arithmetic unit 36 output electrical signal representation Nc of the calculated speed of rotation of the fastest rotating traction motor armature is applied to the noninverting input terminal of this comparator circuit. As the output terminal of comparator circuit 100 is the uncommitted collector electrode of an NPN transistor, resistor 99 is the usual pull-up resistor employed with comparator circuits of this type. Consequently, the potential level of the system output calibrated analog signal representation is compared with the potential level of the Nc signal by comparator circuit 100 which produces a logic 1 output signal when the level of the Nc signal is greater than that of the system output calibrated analog signal representation and a logic 0 output signal when the level of the Nc signal is less than that of the system output calibrated analog signal representation.

The logic 1 output signal produced by comparator circuit 80 while one or more of the previously described selected locomotive and traction motor operating parameters is not satisfied, thereby indicating that the calibration function should not be performed, appears across resistor 101 as a positive polarity potential signal with respect to point of reference or ground potential 5 that is applied through resistor 102 to the anode electrode of diode 103. This positive polarity signal is conducted by diode 103 and applied to the CI input terminal of binary counter circuit 95, thereby disenabling this device. When all of the selected locomotive and traction motor operating parameters are satisfied, comparator circuit 80 produces a logic 0 output calibrate signal in a manner previously described which is applied through this same circuitry to the CI input terminal of binary counter circuit 95, thereby enabling this device to count oscillator 94 output clock pulses.

Should the potential level of the system output calibrated analog signal representation be greater than that of the analog multiplier/divider arithmetic unit 36 output signal Nc, comparator circuit 100 produces a logic 0 output signal that is applied through resistor 104 to the U/D input terminal of binary counter circuit 95. With the presence of this logic 0 signal, binary counter circuit 95 counts the oscillator 94 output clock pulses in decreasing increments of one. Consequently, quad multiplexer circuit 96 responds to this decreasing value of the input binary code group to connect the one or combination of resistors 90, 91, 92 or 93 to point of reference or ground potential 5 in a manner to incrementally reduce the gain of operational amplifier circuit 85.

Should the potential level of the analog multiplier/divider arithmetic unit 36 output signal Nc be greater than that of the system output calibrated analog signal representation comparator circuit 100 produces a logic 1 output signal that is applied through resistor 104 to the U/D input terminal of binary counter circuit 95. With the presence of this logic 1 signal, binary counter circuit 95 counts the oscillator circuit 94 output clock pulses in increasing increments of one. Consequently, quad multiplexer circuit 96 responds to this increasing value of the input binary code group to connect the one or combination of resistors 90, 91, 92 and 93 to point of reference or ground potential 5 in a manner to incrementally increase the gain of operational amplifier circuit 85.

From this description, it is apparent that the potential level of the $N_f$ output signal of operational amplifier circuit 12 is converted into a system output calibrated analog signal representation of the actual speed of rotation of the fastest rotating traction motor armature based upon vehicle ground speed as the circuitry just described operates to adjust the potential level of the system output calibrated analog signal representation in a direction toward that of the Nc output signal of analog multiplier/divider arithmetic unit 36. In normal operation, the system of this invention calibrates the system output calibrated analog signal representation to the point at which the output signal of comparator circuit 100 alternates between a logic 1 and a logic 0 with successive oscillator circuit 94 output clock pulses. The system output calibrated analog signal representation may be applied to external circuitry through output circuit point 130.

To prevent binary counter circuit 95 from counting up from an output binary code group of 1111 and to prevent binary counter circuit 95 from counting down from an output binary code group of 0000 in response to a logic 0 calibrate signal, diode pairs 105–106, 107–108, 109–110, 111–112 and 113–114 and two input NAND gate 115 connected to operate as an inverter circuit are employed. The regulated voltage source is applied through resistor 120 to the anodes of all of diodes 105, 107, 109, 111 and 113, inclusive, and to the anode of diode 121 and the cathodes of all of diodes 106, 108, 110, 112 and 114, inclusive, are connected to point of reference or ground potential 5 through resistor 116 and to both input terminals of two input NAND gate 115. Each bit of the four bit output binary code group of binary counter circuit 95 is connected to a junction between a respective corresponding one of these diode pairs and the output signal of comparator circuit 100 is connected to the junction between a corresponding diode pair. Should the output binary code group of binary counter circuit 95 be 1111 and the output signal of comparator circuit 100 be a logic 1 that indicates binary counter circuit 95 should count up, a logic 1 signal is present upon the junction between each of the diode pairs. Therefore, all of diodes of 105, 107, 109, 111 and 113, inclusive, are reversed biased thereby and, consequently, the logic 1 signal produced by the regulated voltage source is applied through resistor 120 and diode 121 to the CI input terminal of binary counter circuit 95 to disenable this device. Binary counter circuit 95, therefore, is disenabled from counting up from an output binary code group of 1111. Should the output signal of comparator circuit 100 be a logic 0 to indicate that binary counter circuit 95 should count down from 1111, NAND gate 115 inverts the 1111 binary code group to a logic 0 signal that is applied through diode 125 to the CI input terminal of binary counter circuit 95; the junction between diodes 113 and 114 would be at substantially ground potential and junction 126 would be at a potential above ground equal to the voltage drop across diode 113. This signal is treated as a logic 0 signal by diode 121 and is applied to the CI input terminal of binary counter circuit 95. With a logic 0 signal applied to the CI input terminal through each of diodes 103, 121 and 125, binary counter circuit 95 is enabled to count oscillator circuit 94 output clock pulses down. Should the output binary code group of binary counter circuit 95 be 0000 and the output of comparator circuit 100 be a logic 0 that indicates binary counter circuit 95 should count down, a logic 0 signal is present upon the junction between each of the diode pairs. NAND gate 115 inverts these logic 0 signals to a logic 1 output signal that is applied through diode 125 to the CI input terminal of binary counter circuit 95 to disenable this device. Should the output signal of comparator circuit 100 be a logic 1 to indicate that binary counter circuit 95 should count up from 0000, this logic 1 signal applied to the junction between diode pair 113–114 is inverted by NAND gate 115 to a logic 0 signal that is applied through diode 125 to the CI input terminal of binary counter circuit 95 to thereby enable this device to count up.

While a preferred embodiment of the present invention has been shown and described, it will be obvious to those skilled in the art that various modifications and substitutions may be made without departing from the spirit of the invention which is to be limited only within the scope of the appended claims.

The embodiments of the invention in which an exclusive property or privilege is claimed are defined as follows:

1. A system for calibrating an electrical signal representation of the speed of rotation of a rotating element that is suitable for use with a self-propelled vehicle driven by a prime mover including a rotating element operationally coupled to the vehicle drive train having a predetermined input to output drive train ratio, comprising:

means for producing a first electrical signal representation of vehicle ground speed;

means for modifying said first electrical signal representation by a drive train ratio factor in such a manner that said first electrical signal representation is converted into a second electrical signal representation of the theoretical speed of rotation of said prime mover rotating element based upon vehicle ground speed;

means responsive to selected prime mover operating parameters for producing a third electrical signal representation of a calculated speed of rotation of said prime mover rotating element;

means responsive to selected vehicle and prime mover operating parameters for producing a calibrate signal only while all of said selected operating parameters are satisfied; and means for establishing during each said calibrate signal a calibration factor for said second electrical signal representation and for modifying said second electrical signal representation by said calibration factor in such a manner that said second electrical signal representation is converted into a calibrated system output electrical signal representation of the actual speed of rotation of said prime mover rotating element based upon vehicle ground speed, said means being responsive to said calibrate signal, said calibrated system output electrical signal representation and said third electrical signal representation and being effective to establish the said calibration factor required to modify said second electrical signal representation in such a manner that said calibrated system output signal representation and said third electrical signal representation are representative of substantially the same quantity.

2. A system for calibrating an electrical signal representation of the speed of rotation of a rotating element that is suitable for use with a self-propelled vehicle driven by a prime mover including a rotating element operationally coupled to the vehicle drive train having a predetermined input to output drive train ratio, comprising:

means for producing a first electrical signal representation of vehicle ground speed;

means for modifying said first electrical signal representation by a drive train ratio factor in such a manner that said first electrical signal representation is converted into a second electrical signal representation of the theoretical speed of rotation of said prime mover rotating element based upon vehicle ground speed;

means responsive to selected prime mover operating parameters for producing a third electrical signal representation of a calculated speed of rotation of said prime mover rotating element;

means responsive to selected vehicle and prime mover operating parameters for producing a calibrate signal only while all of said selected operating parameters are satisfied;

means for converting said second electrical signal representation into a calibrated system output electrical signal representation, said means being of the type capable of changing the representative value of said second electrical signal representation in response to a calibration factor;

means for establishing during each said calibrate signal a calibration factor and for applying said calibration factor to said means for converting said second electrical signal representation whereby said second electrical signal representation is converted into a calibrated system output electrical signal representation of the actual speed of rotation of said prime mover rotating element based upon vehicle ground speed, said means being responsive to said calibrate signal, said calibrated system output electrical signal representation and said third electrical signal representation and being effective to establish the said calibration factor required to effect the conversion said second electrical signal representation in such a manner that said calibrated system output electrical signal representation and said third electrical signal representation are representative of substantially the same quantity.

3. A system for calibrating an electrical signal representation of the speed of rotation of a rotating element that is suitable for use with a self-propelled vehicle driven by a prime mover including a rotating element operationally coupled to the vehicle drive train having a predetermined input to output drive train ratio, comprising:

means for producing a first electrical analog signal representation of vehicle ground speed;

means for modifying said first analog signal representation by a drive train ratio factor in such a manner that said first analog signal representation is converted into a second analog signal representation of the theoretical speed of rotation of said prime mover rotating element based upon vehicle ground speed;

means responsive to selected prime mover operating parameters for producing a third analog signal representation of a calculated speed of rotation of said prime mover rotating element;

means responsive to selected vehicle and prime mover operating parameters for producing a calibrate signal only while all of said selected operating parameters are satisfied;

a variable gain amplifier circuit for converting said second analog signal representation into a system output analog signal representation; and means responsive to said third analog signal representation, said system output analog signal representation and said calibrate signal for varying the gain of said amplifier circuit in such a manner that the potential level of said system output analog signal representation is adjusted to be substantially equal to that of said third analog signal representation whereby said system output analog signal representation and said third analog signal representation are representative of substantially the same quantity and, therefore, said second analog signal representation is converted into a calibrated system output analog signal representation of the actual speed of rotation of said prime mover rotating element based upon vehicle ground speed.

4. A system for calibrating an electrical signal representation of the speed of rotation of a rotating element that is suitable for use with a self-propelled vehicle driven by a prime mover including a rotating element operationally coupled to the vehicle drive train having a predetermined input to output drive train ratio, comprising:

means for producing a first analog signal representation of vehicle ground speed;

means for modifying said first analog signal representation by a drive train ratio factor in such a manner that said first analog signal representation is converted into a second analog signal representation of the theoretical speed of rotation of said prime mover rotating element based upon vehicle ground speed;

means responsive to selected prime mover operating parameters for producing a third analog signal representation of a calculated speed of rotation of said prime mover rotating element;

means responsive to selected vehicle and prime mover operating parameters for producing a calibrate signal only while all of said selected operating parameters are satisfied;

a variable gain amplifier circuit for converting said second analog signal representation into a system output analog signal representation;

means for comparing the potential level of said third analog signal representation and said system output analog signal representation for producing a first output logic signal when the potential level of said third analog signal representation is greater than that of said system output analog signal representation and a second different output logic signal when the potential level of said third analog signal representation is less than that of said system output signal representation;

means responsive to the application thereto of the produced one of said output logic signals and said calibrate signal for producing a succession of output binary code numerical representations of an incrementally increasing value while a selected one of said first and second output logic signals is applied thereto and of an incrementally decreasing value while the other one of said first and second output logic signals is applied thereto; and means responsive to said binary code numerical representations for varying the gain of said amplifier circuit in such a manner that the potential level of said second analog signal representation is adjusted in a direction toward that of said third analog signal representation whereby said second analog signal representation is converted into a calibrated system output analog signal representation of the actual speed of rotation of said prime mover rotating element based upon vehicle ground speed.

5. A system for calibrating an electrical signal representation of the speed of rotation of a rotating element that is suitable for use with a self-propelled vehicle driven by a prime mover including a rotating element operationally coupled to the vehicle drive train having a predetermined input to output drive train ratio, comprising:

means for producing a first analog signal representation of vehicle ground speed;

means for modifying said first analog signal representation by a drive train ratio factor in such a manner that said first analog signal representation is converted into a second analog signal representation of the theoretical speed of rotation of said prime mover rotating element based upon vehicle ground speed;

means responsive to selected prime mover operating parameters for producing a third analog signal representation of a calculated speed of rotation of said prime mover rotating element;

means responsive to selected vehicle and prime mover operating parameters for producing a calibrate signal only while all of said selected operating parameters are satisfied;

a variable gain amplifier circuit for converting said second analog signal representation into a system output analog signal representation;

a comparator circuit for comparing the potential level of said third analog signal representation and said system output analog signal representation for producing a first output logic signal when the potential level of said third analog signal representation is greater than that of said system output analog signal representation and a second different output logic signal when the potential level of said third analog signal representation is less than that of said system output analog signal representation;

a constant frequency oscillator circuit for producing a series of output signal pulses;

an up/down binary counter circuit responsive to the application thereto of the produced one of said output logic signals, said calibrate signal and said output signal pulses of said oscillator circuit for counting said output signal pulses of said oscillator circuit and producing a succession of output binary code numerical representations of an incrementally increasing value while a selected one of said first and second output logic signals is applied thereto and of an incrementally decreasing value while the other one of said first and second output logic signals is applied thereto; and means responsive to said binary code numerical representations for varying the gain of said amplifier circuit in such a manner that the potential level of said second analog signal representation is adjusted in a direction toward that of said third analog signal representation whereby said second analog signal representation is converted into a calibrated system output analog signal representation of the actual speed of rotation of said prime mover rotating element based upon vehicle ground speed.

6. A system for calibrating an electrical signal representation of the speed of rotation of a rotating element that is suitable for use with a self-propelled vehicle driven by a prime mover including a rotating element operationally coupled to the vehicle drive train having a predetermined input to output drive train ratio, comprising:

means for producing a first analog signal representation of vehicle ground speed;

means for modifying said first analog signal representation by a drive train ratio factor in such a manner that said first analog signal representation is converted into a second analog signal representation of the theoretical speed of rotation of said prime mover rotating element based upon vehicle ground speed;

means responsive to selected prime mover operating parameters for producing a third analog signal representation of a calculated speed of rotation of said prime mover rotating element;

means responsive to selected vehicle and prime mover operating parameters for producing a calibrate signal only while all of said selected operating parameters are satisfied;

an operational amplifier circuit of the type having a gain determined by the resistance value connected to a selected input terminal thereof for converting said second analog signal representation into a system output analog signal representation;

a comparator circuit for comparing the potential level of said third analog signal representation and said system output analog signal representation for producing a first output logic signal when the potential level of said third analog signal representation is greater than that of said system output analog signal representation and a second different output logic signal when the potential level of said third analog signal representation is less than that of said system output analog signal representation;

a constant frequency oscillator circuit for producing a series of output signal pulses;

an up/down binary counter circuit responsive to the application thereto of the produced one of said output logic signals, said calibrate signal and said output signal pulses of said oscillator circuit for counting said output signal pulses of said oscillator circuit and producing a succession of output binary code numerical representations of an incrementally increasing value while a selected one of said first and second output logic signals is applied thereto and of an incrementally decreasing value while the other one of said first and second output logic signals is applied thereto; and an electrical switching arrangement responsive to said binary code numerical representations for connecting various resistance values to said selected input terminal of said operational amplifier circuit to vary the gain of said operational amplifier circuit in such a manner that the potential level of said second analog signal representation is adjusted in a direction toward that of said third analog signal representation whereby said second analog signal representation is converted into a calibrated system output analog signal representation of the actual speed of rotation of said prime mover rotating element based upon vehicle ground speed.

* * * * *